(12) United States Patent
Sommer et al.

(10) Patent No.: US 6,369,583 B1
(45) Date of Patent: Apr. 9, 2002

(54) METHOD FOR DETERMINING THE DISTANCE OF TWO REFERENCE POINTS MOVABLE BETWEEN A LOWER DISTANCE LIMIT AND AN UPPER DISTANCE LIMIT

(75) Inventors: Stefan Sommer, Isernhagen; Alexander Stiller, Garbsen; Wolfgang Schmitt, Hannover, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/604,282

(22) Filed: Jun. 26, 2000

(30) Foreign Application Priority Data

Jun. 24, 1999 (DE) .......................................... 199 28 865

(51) Int. Cl.⁷ .............................................. G01R 27/00
(52) U.S. Cl. ........................ 324/600; 280/5.514; 701/38
(58) Field of Search ........................... 324/600, 207.12, 324/207.2, 207.21, 207.25; 280/5.514, 6.157; 73/862.326; 701/38; 702/105

(56) References Cited

U.S. PATENT DOCUMENTS

| | | |
|---|---|---|
| 4,926,121 A | 5/1990 | Guay |
| 5,267,466 A | 12/1993 | Morris |
| 5,359,288 A | 10/1994 | Riggs et al. |
| 5,461,564 A | 10/1995 | Collins et al. |
| 5,644,225 A | 7/1997 | Alfors et al. |
| 6,278,912 B1 * | 8/2001 | Amano .......................... 701/1 |

FOREIGN PATENT DOCUMENTS

| | | |
|---|---|---|
| DE | 195 34 870 | 3/1997 |
| DE | 197 33 719 | 4/1999 |
| EP | 0402583 | 12/1990 |
| EP | 0534645 | 3/1993 |
| EP | 0544484 | 6/1993 |
| WO | WO 98/57130 | 12/1998 |

* cited by examiner

Primary Examiner—Safet Metjahic
Assistant Examiner—E P LeRoux
(74) Attorney, Agent, or Firm—Walter Ottesen

(57) ABSTRACT

The invention relates to a method for determining the spacing or distance of two reference points which are movable between a lower spacing limit and an upper spacing limit. The method is especially for determining the spacing of a vehicle body of a motor vehicle relative to a fixed reference point. The spacings are determined with the aid of a sensor and this sensor is attached as close as possible to a defined position. Thereafter, an offset is determined from the signal, which is indicated by the sensor, and from the signal, which a sensor would indicate if located in the defined position. For the spacing measurement, this offset is added to the signal, which is indicated by the sensor, and the spacing of the two reference points is determined from the summation signal which results in this way. With the method, it is achieved that an imprecisely installed sensor can be calibrated to a precisely installed sensor.

3 Claims, 5 Drawing Sheets

METHOD FOR DETERMINING THE DISTANCE OF TWO REFERENCE POINTS MOVABLE BETWEEN A LOWER DISTANCE LIMIT AND AN UPPER DISTANCE LIMIT

FIELD OF THE INVENTION

The invention relates to a method for determining the spacing of two reference points which are movable relative to each other between a lower spacing limit and an upper spacing limit. The invention relates especially to a method for determining the spacing of a vehicle body of a motor vehicle relative to a fixed reference point utilizing a sensor having a measuring range subdivided into several sequential measurement value intervals. The same signal interval is assigned to each measurement value interval. The method is based on the following steps, namely: positioning the sensor in a defined position to the two reference points in such a manner that all possible spacings of the reference points are assigned precisely to the measurement values of one measurement value interval; the sensor indicates a lower limit signal in the lower spacing limit and indicates an upper limit signal in the upper spacing limit; the sensor indicates a signal between the lower limit signal and the upper limit signal when the spacing of the reference points lies between the lower and upper spacing limits; and, a conclusion is clearly drawn as to the spacing of the reference points from the signal indicated by the sensor.

BACKGROUND OF THE INVENTION

Modern motor vehicles often have a level control system with air springs at least on the rear axle. With the aid of this system, the level of the vehicle body is adjustable relative to a fixed reference point. Such level control systems afford especially the advantage that the elevation of the vehicle body relative to a fixed reference point can be precisely adjusted independently of the loading condition of the motor vehicle. Furthermore, by charging the air springs with pressurized air, it is possible to lift the vehicle body, for example, in order to impart a greater ground clearance to the vehicle on uneven roadways. Furthermore, the vehicle body of the motor vehicle can be lowered by releasing air from the air springs, for example, in order to facilitate a loading of the vehicle. The vehicle body is therefore movable between a maximum elevation wherein the vehicle body assumes the greatest spacing to a fixed reference point and a minimum elevation wherein the vehicle body assumes the lowest spacing to a fixed reference point.

The level control system requires elevation sensors for controlling the elevation of the vehicle body relative to a fixed reference point. With the aid of the elevation sensors, the elevation of the vehicle body can be determined relative to a fixed reference point. Rotational angle sensors are conventionally used as elevation sensors and known per se. The rotational angular range of the rotational angle sensors is subdivided into sequential rotational angle intervals. Each rotational angle interval is assigned the same signal interval in a characteristic field (such rotational angle sensors are available in the marketplace in the form of vehicle level sensors, for example, as are available from Hella KG of Germany). Each of the rotational angle sensors is built into the vehicle in such a manner that all possible elevations of the vehicle body relative to a fixed reference point are as precisely assigned to the rotational angles of a rotational angle interval and so that the rotational angle sensor moves exclusively between a lower rotational angle and an upper rotational angle. In this case, the signal, which is indicated by the rotational angle sensor, moves exclusively between a lower limit signal and an upper limit signal of a characteristic field. With corresponding programming of the control unit, it is therefore possible to clearly draw a conclusion as to the elevation of the vehicle body relative to a fixed reference point from the signal which a rotational angle sensor indicates.

With the above-mentioned arrangement of a rotational angle sensor, the elevation of the vehicle body of a motor vehicle can be measured simply and precisely relative to a fixed reference point. However, it can happen that the sensor is built in imprecisely or component tolerances add unfavorably so that the sensor assumes rotational angles from two rotational angle intervals during a runthrough of the vehicle body through the entire elevation range (this is characterized in the following as a characteristic field overshoot). A correct assignment of the signal, which is indicated by the sensor, to a vehicle elevation is then no longer easily possible and can lead to a defective control as will be explained hereinafter with reference to the drawings.

SUMMARY OF THE INVENTION

It is an object of the invention to provide a method with the aid of which the spacing of two reference points, which are movable relative to each other between a lower spacing limit and an upper spacing limit can still be determined correctly by means of a sensor as described above when the location of the built-in sensor deviates from a pregiven built-in location therefor. The above spacing is especially the spacing of a vehicle body of a motor vehicle relative to a fixed reference point.

The method for determining the distance of two reference points, which are movable relative to each other between a lower distance limit and an upper distance limit, with a sensor having a measuring range subdivided into several successive measurement value intervals, the sensor outputting a signal with each of the measurement value intervals having the same signal interval assigned thereto, the method being based on the following: the sensor is positioned in a defined position to both of the reference points in such a manner that all possible distances of the reference points correspond to the measurement values of one of the measurement value intervals; the sensor indicates a lower limit signal at the lower distance limit and an upper limit signal at the upper distance limit; the sensor indicates a signal between the lower and upper limit signals when the distance of the reference points lies between the lower and upper distance limits; and, a conclusion is drawn from the signal indicated by the sensor as to the distance of the reference points; the method including:

(a) the following steps for calibrating the sensor: mounting the sensor as close as possible to the defined position relative to the two reference points; and, within at least one distance between the reference points, determining the difference of a signal, which a sensor would indicate if disposed at the defined position, and a signal (S) indicated by the sensor and determining an offset (O) from the difference; and, (b) the following additional steps for determining the distance of the two reference points: adding the offset (O) to the signal (S) indicated by the sensor to form a summation signal (SS=S+O); assigning the distance of the reference points to the summation signal (SS), which distance would be assigned to the same equally large signal, which a sensor would indicate if disposed at the defined position, when the summation signal (SS)

lies between the lower limit signal $S_{min}$ and the upper limit signal $S_{max}$; determining the distance of the reference points from the summation signal (SS) as follows when the summation signal (SS) lies outside of the signal interval from the lower limit signal $S_{min}$ to the upper limit signal $S_{max}$: when the summation signal (SS) lies above the upper limit signal $S_{max}$, assigning a distance of the reference points to the summation signal (SS) which lies in the vicinity of or corresponds to the lower distance limit ($h_{min}$); and, when the summation signal (SS) lies below the lower limit signal ($S_{min}$), assigning a distance of the reference points to the summation signal (SS) which lies in the vicinity of or corresponds to the upper distance limit ($h_{max}$).

As to a spacing, which lies in the vicinity of the lower spacing limit, it is understood to mean a spacing to the lower spacing limit which can lie between zero and ⅕ of the distance between the spacing limits. Correspondingly, a spacing which lies in the vicinity of the upper spacing limit is understood to be a spacing to the upper spacing limit which can lie between 0 and ⅕ of the distance between the spacing limits (for example, the distance between the spacing limits amounts to 100 mm; a spacing then lies in the vicinity of the lower spacing limit when it is between 0 and 20 mm away from the lower spacing limit).

The advantages achieved with the invention are especially seen in that the elevation of a vehicle body of a motor vehicle can even be determined with the aid of the above-mentioned sensors when one of the sensors is imprecisely built in because a characteristic field overwrite is detected and therefore an erroneous interpretation of the sensor signal is avoided. In this way, a position correction of a sensor is not necessary even when the sensor is not at the exact position. Rather, a fictive position correction is undertaken by considering the offset which is added to the signal indicated by the sensor. A further advantage of the invention is seen in that the fictive position correction of a sensor, which is imprecisely built in, is possible via the determination of a single offset. This offset can, for example, be already determined without great complexity and therefore cost effectively, for example, during the manufacture of the motor vehicle with a calibration of each sensor. A further advantage is seen in that the method of the invention applies to sensors which are available as cost effective standard components. In this way, a level control system with which the method of the invention is carried out is not more expensive relative to conventional level control systems equipped with such sensors.

According to another feature of the invention, wherein the signal, which is indicated by the sensor, is compared to an ideal signal which the sensor would provide if located in the defined position, the spacing or distance of the two reference points lies in a range wherein the characteristic line, which is generated by the sensor, runs substantially linearly. The advantage of this embodiment is seen in that the offset can be very easily and precisely determined.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
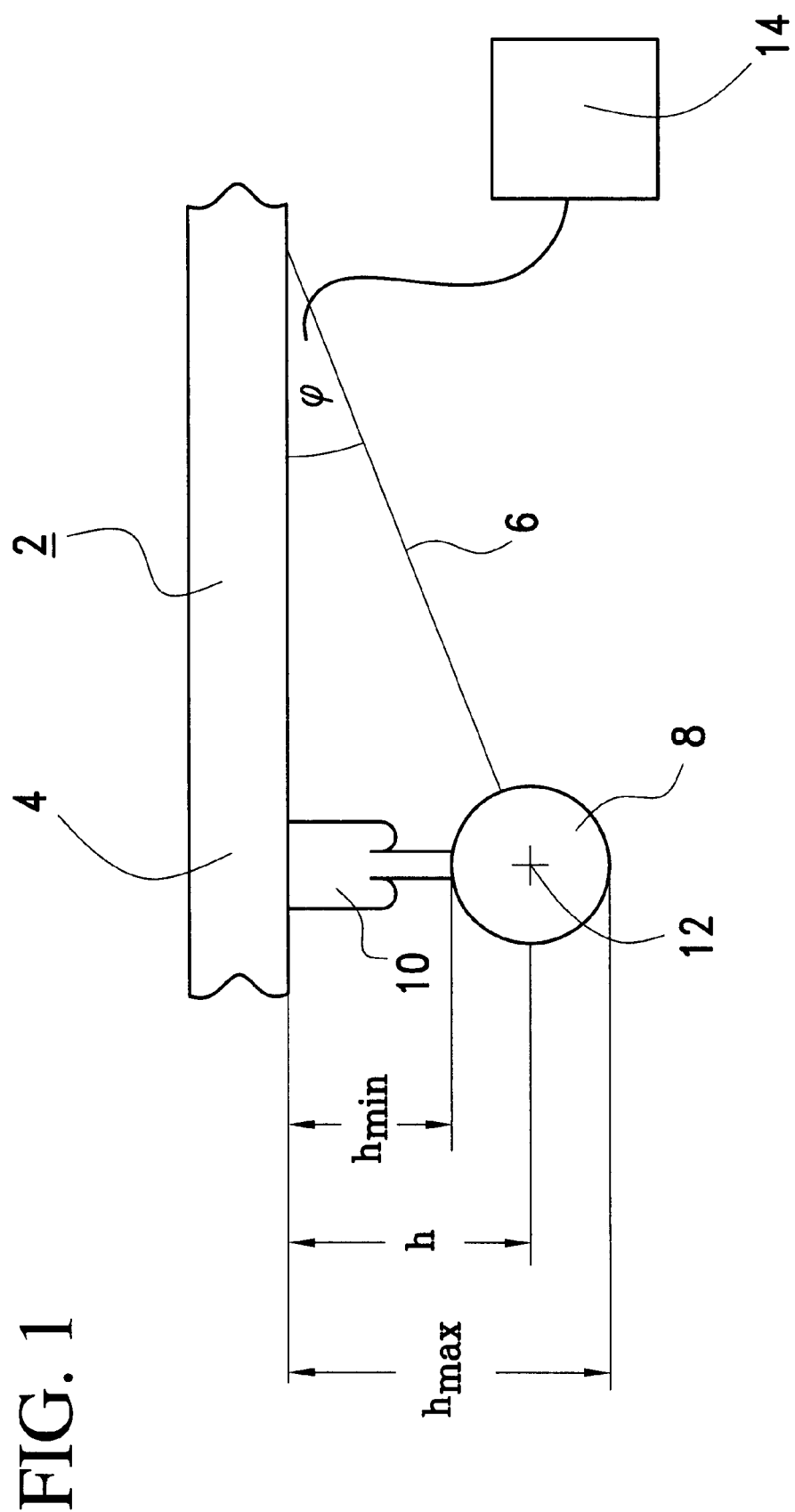
FIG. 1 is a schematic showing a detail of a motor vehicle having a suspended vehicle wheel.

FIG. 1 shows a simplified schematic of a detail from a motor vehicle 2 having a vehicle body 4. The vehicle body 4 is connected to a wheel 8 of the vehicle via a longitudinal control arm 6 and is suspended relative thereto by means of an air spring 10. The vehicle body 4 assumes an elevation (h) to a fixed reference point of the motor vehicle, for example, to the center point 12 of the wheel 8. By charging the air spring 10 with pressurized air, the spacing or distance of the vehicle body 4 from the center point 12 of the wheel 8 can be increased to a maximum spacing $h_{max}$. The vehicle then has a maximum ground clearance. By deflating the air spring 10, the vehicle body 4 can be dropped to a minimum spacing $h_{min}$ relative to the center point 12 of the wheel 8 in that the vehicle 2 sets down on bumpers (not shown). The motor vehicle then assumes its lowest elevation. The vehicle body 4 can assume any elevation between $h_{min}$ and $h_{max}$.

The spacing or distance (h) of the vehicle body 4 to the center point 12 of the wheel 8 is controlled with the aid of a central unit 14 as will now be explained.

The angle φ between the vehicle body 4 and the longitudinal control arm 6 is measured with the aid of a rotational angle sensor. From the measured angle φ, the rotational angle sensor generates a signal S which is transmitted to the central unit 14. In the central unit 14, a characteristic field is stored wherein the signals, which are transmitted from the rotational angle sensor, are shown in dependence upon the elevation (h) of the vehicle body 4 to the center point 12 of the wheel 8. Because of a signal, which is transmitted by the rotational angle sensor, a conclusion as to the spacing (h) can be drawn in the central unit 14 with the aid of the stored characteristic field. The actually determined spacing (h) is compared to a pregiven spacing which the vehicle body 4 should assume relative to the center point 12 of the wheel 8 in the actual driving situation of the motor vehicle 2. If the measured spacing (h) is below this pregiven spacing, then the central unit 14 causes the air spring 10 to be charged with pressurized air; otherwise, the central unit 14 causes the pressurized air to be vented from the air spring 10. The same procedure is followed with the other air springs of the motor vehicle 2.

Figure 2:
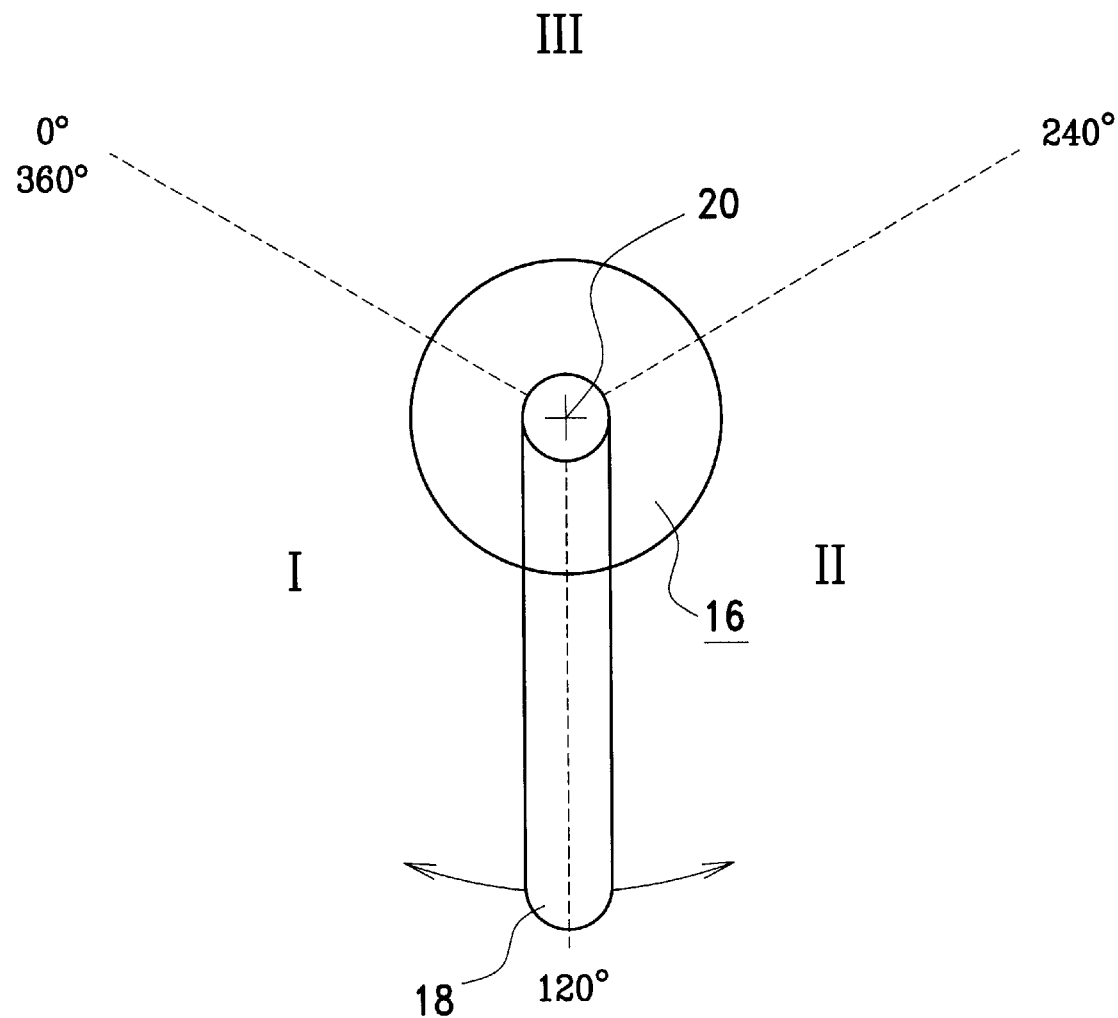
FIG. 2 is a schematic of a rotational angle sensor.

FIG. 2 shows a schematic representation of a rotational angle sensor 16 with which the angle φ (see FIG. 1) can be measured. The rotational angle sensor 16 has an actuating lever 18 which is rotatably journalled at point 20 in the plane of the drawing. The rod 18 can scan the complete angular range of 0° to 360°. The total measuring range of the rotational angle sensor 16 is subdivided into three sequential measurement value intervals I, II and III. The measurement value interval I extends from 0° to 120° and the measurement value interval II extends from 120° to 240° and the measurement value interval III extends from 240° to 360°.

Figure 3:
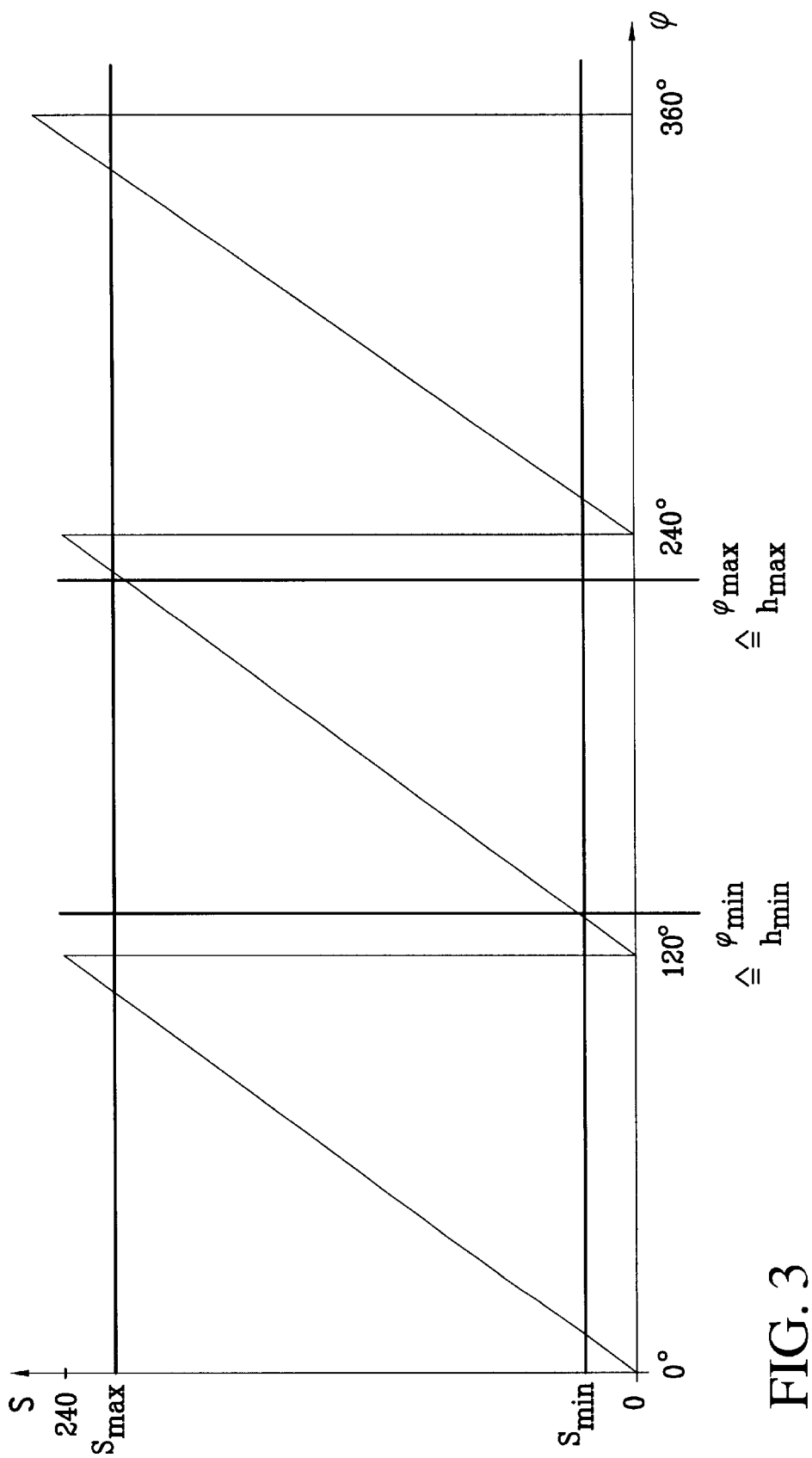
FIG. 3 is a diagram showing the sensor signal as plotted against the angle φ.

In connection with FIG. 3, it will now be explained which signals the rotational angle sensor 16 generates when scanning the individual measurement value intervals I, II and III. When scanning the measurement value interval I from 0° to 120°, the rotational angle sensor generates the signal 0 in the zero-degree-position and the signal 240 in the 120°-position. In the angular positions therebetween, the rotational angle sensor 16 generates the corresponding signals. A linear relationship is present between the angular position of the rotational angle sensor 16 and the signal generated by the sensor as is shown also in FIG. 3. Therefore, a characteristic field arises in the measurement value interval I wherein each measurement value of the measurement value interval is assigned precisely to a signal of the signal interval from 0 to 240 and vice versa. The signal interval from 0 to 240 is likewise assigned to the measurement value intervals II and III. The rotational angle sensor 16 therefore indicates, in angular position which are displaced relative to each other by 120°, the same signal in each case (for example, in the angular positions 60°, 180° and 300°, the rotational angle sensor 16 shows the signal 120 in each case).

The rotational angle sensor 16, which is shown in FIG. 2, is positioned between the vehicle body 4 and the longitudinal control arm 6 (see FIG. 1) during the manufacture of the vehicle in such a manner that all possible angles φ, which can be assumed between the vehicle body and the longitudinal control arm 6 when the spacing (h) varies between $h_{max}$ and $h_{min}$, lie within precisely one of the measurement value intervals of the rotational angle sensor 16. For example, the rotational angle sensor 16 is positioned in such a manner that all possible rotational angles φ lie between 120° and 240°, that is, in the measurement value interval II. In this case, the rotational angle sensor 16 shows a lower limit signal $S_{min}$ at the lower spacing limit $h_{min}$ (wherein a rotational angle $φ_{min}$ is assumed) and indicates an upper limit signal $S_{max}$ (see FIG. 3) at the upper spacing limit $h_{max}$ (wherein a rotational angle $φ_{max}$ is assumed). Each spacing of the vehicle body 4 to the center point 12 of the wheel 8 between $h_{min}$ and $h_{max}$ then corresponds to an angle φ between $φ_{min}$ and $φ_{max}$ and permits a clear allocation to a signal S between $S_{min}$ and $S_{max}$. Conversely, a conclusion can be clearly drawn as to the spacing of the vehicle body 4 to the center point 12 of the wheel 8 from the signal S indicated by the rotational angle sensor 16 when the rotational angle sensor is built in with corresponding accuracy. With the manufacture of the motor vehicle, each rotational angle sensor is built in in such a manner that it is in a defined position wherein the above-mentioned conditions are satisfied. The central unit can then clearly determine an elevation of the vehicle body with corresponding programming from the signal of the rotational angle sensor.

During the manufacture of the motor vehicle, it can, however, happen that the rotational angle sensor 16 is built in in such a manner that rotational angles from a first measurement value interval as well as rotational angles from a second measurement value interval are scanned by the rotational angle sensor 16 when the spacing (h) of the vehicle body 4 (see FIG. 1) varies between $h_{min}$ and $h_{max}$. A correct determination of the spacing (h) from the signal S, which is generated by the rotational angle sensor, is then no longer easily possible which will be explained hereinafter.

Figure 4:
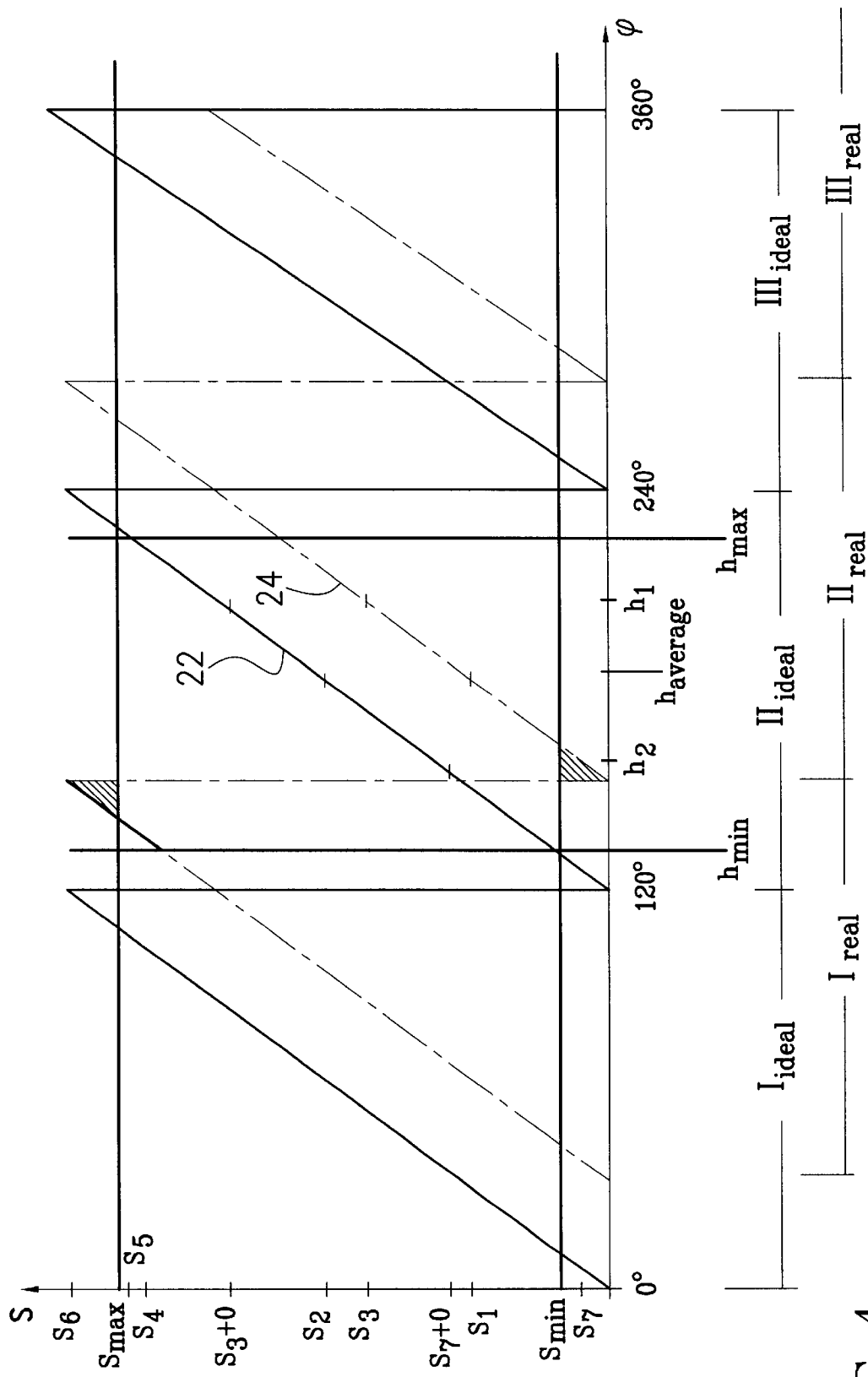
FIG. 4 is a diagram showing the signal S plotted against the rotational angle φ of the rotational angle sensor; and, FIG. 5 is a diagram corresponding essentially to FIG. 4 but showing the real characteristic line relative to an ideal characteristic line.

FIG. 4 shows a diagram wherein the signal S is plotted against the rotational angle φ of the rotational angle sensor. The ideal characteristic line 22 in the diagram is generated by a rotational angle sensor which was built into the motor vehicle in a defined position in such a manner that the rotational angles $φ_{min}$ and $φ_{max}$, which are assumed at spacings $h_{min}$ and $h_{max}$, both lie within one measurement value interval, for example, in measurement value interval II. As explained above, it is possible in this case to clearly determine the spacing (h) from the signal S indicated by the rotational angle sensor 16. The central unit 14 controls the spacing or distance of the vehicle body 4 to the center point 12 of the wheel 8 (see FIG. 1) and is so programmed that it takes as the basis in the control the spacing of the ideal characteristic line 22. Accordingly, in the central unit 14, the elevation $h_{min}$ is assigned to the signal $S_{min}$ and the elevation $h_{max}$ is assigned to the signal $S_{max}$ and the elevations between $h_{min}$ and $h_{max}$ are assigned to signals which lie between $S_{min}$ and $S_{max}$. In the manufacture of the motor vehicle, it can, however, happen that the rotational angle sensor 16 is built in in such a manner that rotational angles from different measurement value intervals are scanned between the spacings $h_{min}$ and $h_{max}$. In FIG. 4, a real characteristic line 24 is shown which presents the situations when rotational angles of measurement value interval I as well as rotational angles of measurement value interval II are scanned between the spacings $h_{min}$ and $h_{max}$ thereby causing a characteristic field overwrite to occur. The real characteristic line 24 is displaced laterally to the right relative to the ideal characteristic line 22.

The following problems occur because of the imprecise installation of the rotational angle sensor 16. As a consequence of the lateral displacement of the ideal characteristic line 22 into the real characteristic line 24 the situation occurs that signals S from the rotational angle sensor 16 are indicated in the vicinity of $S_{max}$ even though the spacing (h) of the vehicle body 4 to the center point 12 of the wheel 8 lies in the proximity of $h_{min}$ (the corresponding part of the real characteristic line 24 is shown in FIG. 4 as a thick line). The central unit 14 operates with the ideal characteristic line 22. For this reason, the control unit 14 draws the conclusion of a large spacing in the vicinity of $h_{max}$ from this high signal value. If the motor vehicle is to be controlled to a mean spacing between $h_{min}$ and $h_{max}$, then the central unit would cause air to be vented from the air springs 10 even though the motor vehicle is at a level in the vicinity of $h_{min}$ so that a filling of the air springs would be necessary. Because of this imprecisely installed rotational angle sensor 16, the central unit would therefore undertake precisely the control which is opposite to the control which is actually necessary.

In connection with FIG. 4, it will be explained hereinafter how the above-mentioned problems can be solved with the method according to the invention.

In the manufacture of the motor vehicle, the rotational angle sensor 16 is mounted as close as possible to the defined position to the vehicle body 4 and to the center point 12 of the wheel 8 so that the real characteristic line 24 lies as close as possible to the ideal characteristic line 22 which is the basis for control in the central unit 14. Thereafter, at a spacing $h_{average}$ (which corresponds to the defined normal level of the vehicle body), the signal $S_1$, which is indicated by the rotational angle sensor 16, is compared to the ideal signal $S_2$, which a rotational angle sensor would indicate located in exactly the defined position. The spacing $h_{average}$ is preferably at approximately the center between $h_{min}$ and $h_{max}$. An offset $O=S_2-S_1$ is determined from the signals $S_2$ and $S_1$. The offset O is stored permanently in the central unit 14 (see FIG. 1) together with the ideal characteristic line 22.

The spacing $h_{average}$ of the vehicle body to a fixed reference point must be adjusted as precisely as possible to determine the offset O. This can, for example, take place by measuring the spacing with an external precise distance measuring system. Thereafter, the ideal signal $S_2$ is determined and the offset O is computed as explained above.

In the operation of the motor vehicle 2, the spacing of the vehicle body 4 to the center point 12 of the wheel 8 takes place as will now be explained. The offset O is added to the signal S indicated by the rotational angle sensor 16 so that a summation signal SS=S+O results. The spacing of the vehicle body 4 to the center point of the wheel 2 is assigned to the summation signal SS. This spacing belongs to the equally large signal S of the ideal characteristic line 22 when the summation signal SS lies within the signal interval from $S_{min}$ to $S_{max}$ (including the interval limits).

Example: The signal $S_3$ is indicated by the rotational angle sensor 16. The offset O is added to this signal $S_3$ so that the summation signal SS=$S_3$ +O results. The summation signal SS=$S_3$ +O lies above $S_{min}$ and below $S_{max}$ and therefore within the signal interval from $S_{min}$ to $S_{max}$ (see FIG. 4). The central unit 14 assigns the summation signal SS=$S_3$+O to the elevation $h_1$ which belongs to the equally large signal S=$S_3$ +O of the ideal characteristic line 22.

It can, however, happen that a signal S is indicated from the rotational angle sensor 16 and the summation signal SS=S+O corresponding to signal S lies above the upper limit signal $S_{max}$ and thereby lies outside of the signal interval of $S_{min}$ to $S_{max}$ (in FIG. 4, this is the case for all signals of the signal interval from $S_4$ to $S_6$). In this case, the central unit 14 assigns the signal, which is indicated by the rotational angle sensor, to an elevation of the vehicle body 4 to the center point 12 of the wheel 8 which lies in the proximity of the lower spacing limit $h_{min}$ (and preferably between $h_{min}$ and $h_{max}$) or corresponds to this spacing limit $h_{min}$. An incorrect control by the central unit is therefore not possible because the central unit assigns at least qualitatively the correct spacing to the signal of the rotational angle sensor. Example: The signal $S_5$ is indicated by the rotational angle sensor 16 so that the summation signal SS=$S_5$+O lies above the upper limit signal $S_{max}$. The central unit 14 assigns the elevation $h_{min}$ or an elevation which lies in the proximity of $h_{min}$ to the signal $S_5$. This corresponds to the actual conditions so that no incorrect control occurs in the central unit 14 when the central unit takes this allocation as a basis for the subsequent control of the spacing of the vehicle body 4 to the center point 12 of the wheel 8.

If a signal S is indicated by the rotational angle sensor 16 which lies between 0 and $S_{min}$ and when the offset O is added to this signal, then the summation signal SS lies in the signal interval from $S_{min}$ to $S_{max}$. The spacing of the vehicle body 4 to the center point 12 of the wheel 8 is than assigned to the summation signal SS and this spacing belongs to the equally large signal S of the ideal characteristic line 22. Example: The rotational angle sensor indicates the signal $S_7$ from which the central unit 14 forms the summation signal SS=$S_7$ +O. The summation signal SS lies within the signal interval from $S_{min}$ to $S_{max}$ so that the elevation $h_2$ is assigned to the signal $S_7$ and/or the summation signal SS.

Figure 5:
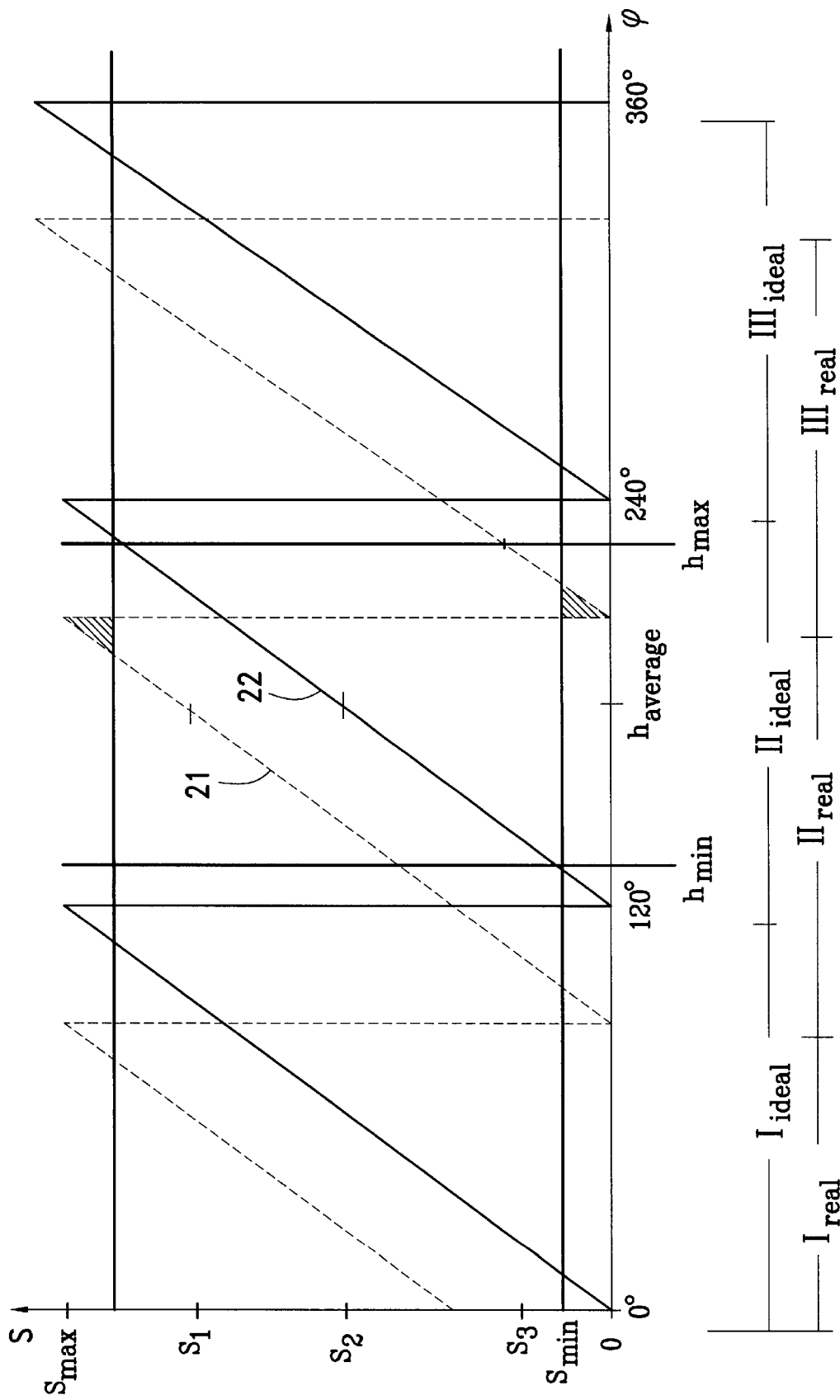

FIG. 5 shows a diagram which substantially corresponds to FIG. 4. The only difference is that the real characteristic line 24 is displaced toward the left relative to the ideal characteristic line 22. This has the consequence that the rotational angle sensor 16 scans measurement values of the measurement value interval II as well as measurement values of the measurement value interval III between the smallest spacing $h_{min}$ and the greatest spacing $h_{max}$. When calibrating the rotational angle sensor 16, the signal $S_1$, which is indicated by the rotational angle sensor 16, is compared to the signal $S_2$, which a precisely installed rotational angle sensor would have indicated at $h_{average}$. An offset O=$S_2$-$S_1$ is, in turn, computed from the signals $S_2$ and $S_1$ (in this context, it is noted that the offset O is negative in the case of a real characteristic line 24 which is shifted to the left because $S_1$ is greater than $S_2$) The offset O=$S_2$-$S_1$, in turn, is permanently stored in the central unit 14 together with the ideal characteristic line 22 which assigns a clear elevation to each signal in the signal interval from $S_{min}$ to $S_{max}$.

In later operation of the motor vehicle 4, the elevation of the vehicle body 4 relative to the center point 12 of the wheel 8 is determined in the central unit from the signal of the rotational angle sensor 16 as will now be explained.

The offset O is added to the signal S indicated by the rotational angle sensor 16 so that a summation signal SS=S+O results. In this connection, it should be noted that the amount of the offset is subtracted from the signal S which is the same thing when one considers that the offset is negative. If the summation signal lies within the signal interval from $S_{min}$ to $S_{max}$, then an elevation is assigned to the summation signal SS in the same manner as was explained above in connection with FIG. 4.

An elevation of the vehicle body 4 above the center point 12 of the wheel 8 is assigned to the summation signal SS when the rotational angle sensor 16 indicates a signal whose summation signal SS=S+O lies below the lower limit signal $S_{min}$. The elevation assigned lies in the proximity of the upper spacing limit $h_{max}$ (and preferably between $h_{min}$ and $h_{max}$) or corresponds to this. In this way, it is recognized also for such signals of the rotational angle sensor 16 that the vehicle body 4 is located in the vicinity of $h_{max}$ so that the central unit 14 can undertake a corresponding control in order to lower the vehicle body 4.

It is understood that the foregoing description is that of the preferred embodiments of the invention and that various changes and modifications may be made thereto without departing from the spirit and scope of the invention as defined in the appended claims.

What is claimed is:

1. A method for determining the distance of two reference points, which are movable relative to each other between a lower distance limit and an upper distance limit, with a sensor having a measuring range subdivided into several successive measurement value intervals, said sensor outputting a signal with each of said measurement value intervals having the same signal interval assigned thereto, the method being based on the following: the sensor is positioned in a defined position to both of said reference points in such a manner that all possible distances of said reference points correspond to the measurement values of one of said measurement value intervals; said sensor indicates a lower limit signal at said lower distance limit and an upper limit signal at said upper distance limit; said sensor indicates a signal between said lower and upper limit signals when said distance of said reference points lies between said lower and upper distance limits; and, a conclusion is drawn from said signal indicated by said sensor as to the distance of said reference points; the method comprising:

(a) the following steps for calibrating said sensor:
    mounting said sensor as close as possible to said defined position relative to said two reference points; and,
    within at least one distance between said reference points, determining the difference of a signal, which a sensor would indicate if disposed at said defined position, and a signal (S) indicated by said sensor and determining an offset (O) from said difference; and, (b) the following additional steps for determining the distance of said two reference points:
    adding said offset (O) to said signal (S) indicated by said sensor to form a summation signal (SS=S+O);
    assigning the distance of said reference points to said summation signal (SS), which distance would be assigned to the same equally large signal, which a sensor would indicate if disposed at said defined position, when said summation signal (SS) lies between the lower limit signal $S_{min}$ and the upper limit signal $S_{max}$;

determining the distance of said reference points from said summation signal (SS) as follows when said summation signal (SS) lies outside of the signal interval from said lower limit signal $S_{min}$ to said upper limit signal $S_{max}$:

when said summation signal (SS) lies above the upper limit signal $S_{max}$, assigning a distance of said reference points to said summation signal (SS) which lies in the vicinity of or corresponds to said lower distance limit ($h_{min}$); and, when said summation signal (SS) lies below said lower limit signal ($S_{min}$), assigning a distance of said reference points to said summation signal (SS) which lies in the vicinity of or corresponds to said upper distance limit ($h_{max}$).

2. The method of claim 1, wherein the distance of said reference points, wherein the signal, which is indicated by said sensor, is compared to the ideal signal, which a sensor would indicate if disposed at said defined position, lies in a region wherein the characteristic line generated by said sensor runs substantially linearly.

3. The method of claim 2, wherein said distance is determined of a vehicle body of a motor vehicle relative to a fixed reference point.

* * * * *